No. 701,302. Patented June 3, 1902.
G. H. CROSBY.
WHEEL.
(Application filed Jan. 11, 1902.)
(No Model.)
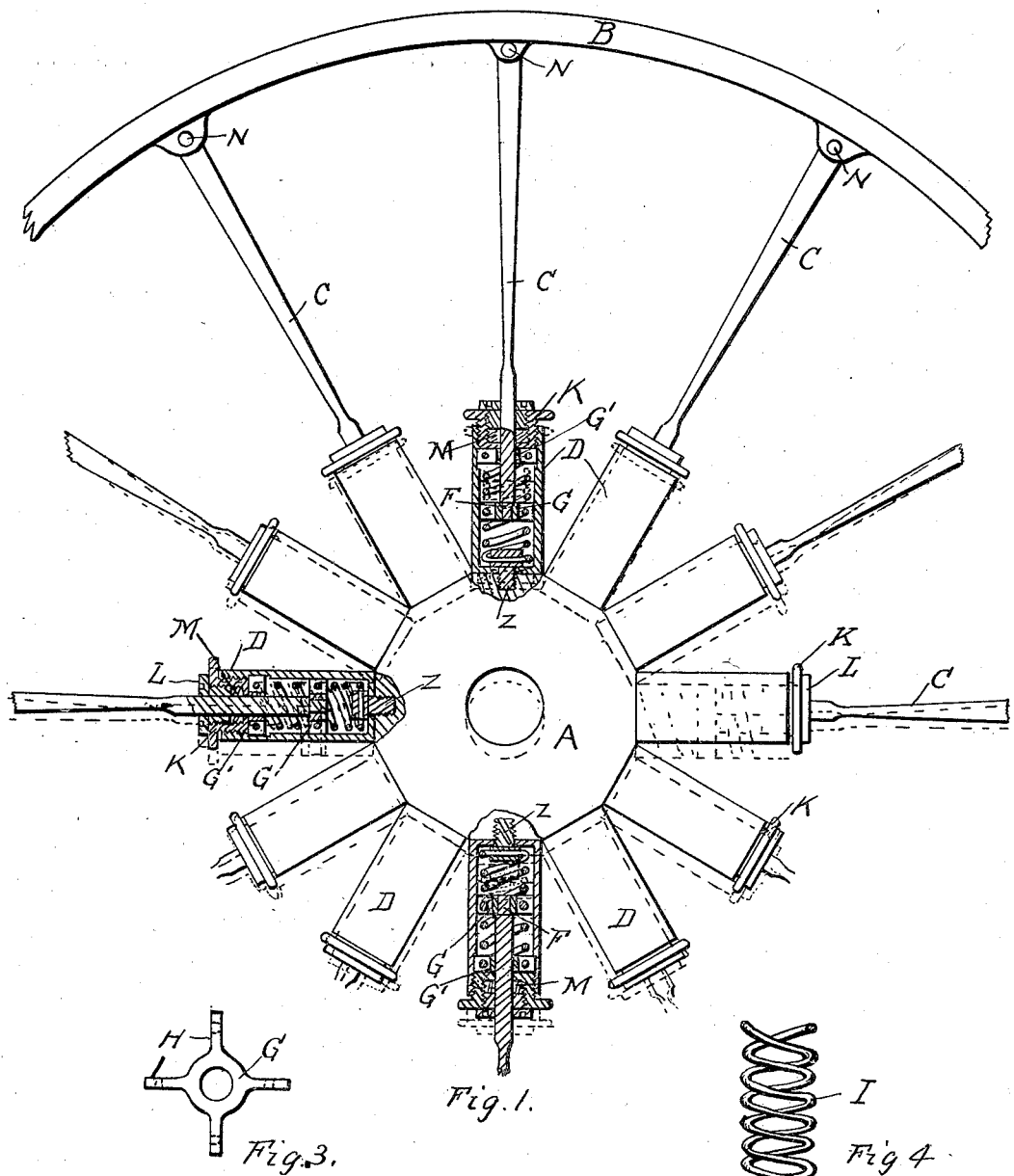
Fig. 1.
Fig. 3.
Fig. 4.
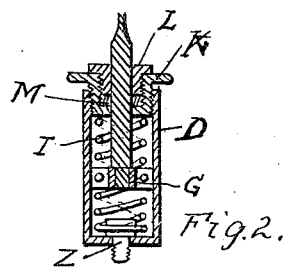
Fig. 2.
Witnesses.
H. C. Shaw
Marion Richards.
Inventor.
George H. Crosby,
by Verrill & Clifford
Attorneys.

UNITED STATES PATENT OFFICE.

UNITED STATES PATENT OFFICE.

GEORGE H. CROSBY, OF ALBION, MAINE.

WHEEL.

SPECIFICATION forming part of Letters Patent No. 701,302, dated June 3, 1902.

Application filed January 11, 1902. Serial No. 89,311. (No model.)

*To all whom it may concern:*

Be it known that I, GEORGE H. CROSBY, a citizen of the United States, residing at Albion, in the county of Kennebec and State of Maine, have invented certain new and useful Improvements in Wheels; and I do hereby declare the following to be a full, clear, and exact description of the invention, such as will enable others skilled in the art to which it appertains to make and use the same.

My invention relates to improvements in vehicle-wheels, and has for its object to provide means for automatically preventing the jolting and jarring due to uneven road-beds and for relieving the shock of the load from the running-gear. This I accomplish by making the hub which bears the load free to yield relative to the rim and providing means for distributing the weight of the load over the entire wheel. By thus distributing the load I obviate the liability of breaking the rim by reason of the weight being thrown upon a limited number of spokes, whence it is transmitted to only a section of the rim of the wheel, leaving the remainder practically unsupported, as is the case when the hub is yieldingly supported only upon the spokes, which at any point in the revolution of the wheel extend downwardly toward the ground.

In the construction of my improved wheel I provide at the hub a series of spoke-retaining cases adapted to contain a coil-spring and secure the hub end of the spoke to said spring intermediate its length, so that when the hub moves away from the center of the rim in any direction the spokes extending in the opposite direction to the movement of the hub are still charged with their share of the work of supporting the hub.

The construction and operation of my improved wheel will be apparent from the full detail description which follows, reference being had to the accompanying drawings, which illustrate two methods of embodying my invention; but I do not wish to limit myself to the particular embodiments described, as the method of constructing the spoke-casing and supporting the end of the spoke therein may be varied greatly without departing from the spirit and scope of my invention.

In said drawings, Figure 1 is a broken side elevation of a portion of a wheel sufficient to illustrate my invention, some of the spoke-cases being shown in vertical section. Fig. 2 is a vertical sectional view of one of the spoke-cases, showing the outer ends of the spring unattached to the top of the case. Fig. 3 is a plan view of the cross-head upon which the end of the spoke is mounted, and Fig. 4 is a side elevation of the spring to which the cross-head is secured.

Same letters of reference refer to like parts.

In said drawings, A represents the hub of a wheel; B, the rim; C, the spokes, and D a series of spoke-cases extending in a radial direction from the hub in number equal to the number of spokes in the wheel. Said spoke-cases may be made integral with the hub or they may be adapted to be secured thereto in any convenient manner—as, for example, by threaded screws passing through the bottoms of the cases and into the body of the hub, as shown in Fig. 1. The end F of each spoke is stepped in a cross-head G, which may for convenience have a series of radial arms H, with holes therein, through which the coils of the spring I pass, the cross-head being positioned upon the spring at any desired distance between the ends thereof, according to the direction in which it is desired to have the greatest force of the spring, and to prevent lateral movement of the spoke the ends of said arms fit closely against the wall of the case. The inner end of the spring is secured in a staple adapted to be secured to the bottom of the case, and, as shown, the staple forms the head of the bolt, which secures the case to the hub of the wheel. As shown in Fig. 1, the outer ends of the spring, which is a double spring, is secured to a cross-head G', rigidly set in the outer end of the case. In the outer end of the case is a set nut or cap K, adapted to be screwed down upon the spring to hold the spring in its case and when desired to give a greater or less amount of compression to the spring, whereby there is always a certain amount of tension on the spring. The end of the spoke passes through this cap with a more or less close fit and the outer end of the cap may be countersunk and threaded to receive a supplemental nut L, between which and the cap is a packing M. In Fig. 2 the ends of the spring are free and when the spoke penetrates the case beyond its normal position the outer portion of the spring exerts no restraining force, as it does when the outer ends of the springs are rigidly secured in the tops of the cases, as in Fig. 1. The outer ends of the spokes are secured in the rim in any convenient manner, as by pivot-bars N, which permit them to have movement in the plane of the wheel. The spokes should be of spring metal, and inasmuch as the load is supported at all times equally in all directions by the springs, as well above the hub as below, spokes of much less diameter can be used than would be practicable if it were only supported on the spokes below the hub.

The operation of my improved wheel is as follows: The full lines show the normal position of the wheel, the dotted lines the position of the wheel when carrying the load. It will be seen that when loaded the axle falls below the radial center of the wheel. In its movement the spokes remaining stationary relative to the rim, the spring-cases above the center move toward the ground relative to the spokes, compressing the portion of the spring between the cross-head and top of the case and distending the portion of the spring between the cross-head and the bottom of the case, while the spring-cases below the axle move toward the ground, but the portion of the spring between the cross-head and the bottom of the case is compressed and the portion between the cross-head and the top of the case is distended. In both cases the springs tend to support the hub and the load on the wheel from above as well as from below, and being yieldingly supported in all directions the strain is equally distributed throughout the entire rim. The spokes are pivotally joined to the rim and are slightly flexible, so as to pivot and bend slightly in the plane of the wheel as the hub moves relative to the rim. When the form shown in Fig. 2 is employed, the portion of the spring between the cross-head and the outer end of the case will not be distended when the cross-head is moved toward the bottom of the spring-case. The normal tension of the spring in the case can be increased or diminished by means of the screw-cap on the spring-case.

I wish it understood that I do not hereby intend to limit myself to the use of a particular kind of coil-spring, nor to the particular manner of constructing the spring-containing case, nor the particular manner of mounting the spokes therein, except as set out in the claims hereto annexed.

Having thus described my invention and its use, I claim—

1. In a vehicle-wheel, a rim, a hub provided with a plurality of radial spoke-retaining cases, a spring set in each of said cases, means for confining said springs in said cases, and a series of spokes, each spoke having one end secured to the rim and the other end to one of said springs midway its length, whereby the hub is yieldingly supported.

2. In a vehicle-wheel, a rim, a hub provided with a plurality of radial spoke-retaining cases, a series of spokes and a series of springs set in each of said spoke-retaining cases, one end of said springs being secured to the bottom of said case, each of said spokes having one end secured to the rim and the other end to a spring midway its length.

3. In a vehicle-wheel, a rim, a hub provided with a plurality of radial spoke-retaining cases, a coil-spring set in each of said cases, a threaded cap adapted to screw into the outer end of said case and bear against the end of the spring therein compressing said spring and a plurality of spokes each having one end secured to the rim of the wheel and the other end passing through the cap and being secured to said spring midway its length.

4. In a vehicle-wheel, a rim, a hub, provided with a plurality of radial spoke-retaining cases, a spring set in each of said cases, a cross-head secured to the spring midway its length and adapted to have sliding contact with the walls of said casing and a plurality of spokes each having one end secured to the rim and the other end secured to said cross-head and a cap fitting the outer end of said spoke-retaining case and adapted to hold said springs therein.

5. In a vehicle-wheel, a rim, a hub provided with a plurality of radial spoke-retaining cases, a double coil-spring, wound from the middle into a double coil set in each of said cases, means for confining said spring in said cases and a series of spokes, each spoke having one end secured to the rim and the other end to one of said springs intermediate its length, whereby the hub is yieldingly supported.

6. In a vehicle-wheel, a rim, a hub provided with a plurality of spoke-retaining cases, a spring set in each of said cases, means for confining said springs in said cases normally under some degree of tension and a series of spokes, each spoke having one end secured to the rim and the other end to one of said springs intermediate its length, whereby the hub is yieldingly supported.

In testimony whereof I have hereunto affixed my signature, in presence of two witnesses, this 7th day of January, 1902.

GEORGE H. CROSBY.

In presence of—
ELGIN C. VERRILL,
NATHAN CLIFFORD.